J. FAUSSE.
DEVICE FOR MAKING PUTTEES.
APPLICATION FILED JAN. 5, 1918.

1,353,823. Patented Sept. 28, 1920.

INVENTOR
Joseph Fausse

UNITED STATES PATENT OFFICE.

JOSEPH FAUSSE, OF BROCKTON, MASSACHUSETTS, ASSIGNOR TO UNITED SHOE MACHINERY CORPORATION, OF PATERSON, NEW JERSEY, A CORPORATION OF NEW JERSEY.

DEVICE FOR MAKING PUTTEES.

1,353,823.

Specification of Letters Patent. Patented Sept. 28, 1920.

Application filed January 5, 1918. Serial No. 210,548.

*To all whom it may concern:*

Be it known that I, JOSEPH FAUSSE, a citizen of the United States, residing at Brockton, in the county of Plymouth and State of Massachusetts, have invented certain Improvements in Devices for Making Puttees, of which the following description, in connection with the accompanying drawings, is a specification, like reference characters on the drawings indicating like parts in the several figures.

This invention relates to the manufacture of articles formed from sheet material, and in particular to the manufacture of puttees. Under the present practice these articles are roughly shaped and then "lasted" or stretched while damp over and into conformation with a block of the general shape of the calf of a leg, but of considerably greater diameter, so that the edges of the puttee will not overlap. When the leather has dried on the block, it is removed and trimmed to the size desired.

Various practices are resorted to for trimming the puttees. The front or overlapping edges, which are nearly straight and flat, are sometimes die trimmed by a clicking machine, and the top and bottom are then trimmed by hand. Another practice involves trimming the entire edge with dies by hand. Still another way of trimming these articles involves the use of a form or jacket corresponding in size to the trimmed puttee which can be placed outside or inside the lasted puttee after its removal from the lasting block and whose edges furnish a guide to the trimming knife. The edges of the lasting or shaping block itself cannot serve as trimming guides because its surface is considerably larger than that of the finished article in order to support the edges which are to be trimmed off and which are used in fastening and stretching the article on the block.

All of these practices involve considerable expense for tools and are unsatisfactory, because of difficulty in performing the operation with speed and accuracy. The curved form of the article makes it difficult to trim with dies, and its flexibility in the direction in which it is rolled and its comparative stiffness in other directions make it awkward to handle and especially to trim if not well supported. It is an object of my invention to obviate these and other such difficulties and to provide for the rapid and accurate trimming of articles formed of sheet material including such puttees.

An important feature of the invention consists in a block for conforming articles of sheet material, presenting an outline of the finished article desired. In the embodiment of the invention shown in the drawings, this outline is formed as a narrow slot and constitutes a guide for a trimming tool.

These and other features of the invention, including important details of constructions and combinations of parts, will be hereinafter more fully described in connection with the accompanying drawings which illustrate a preferred form of the invention and in which.

Figures 1, 3:
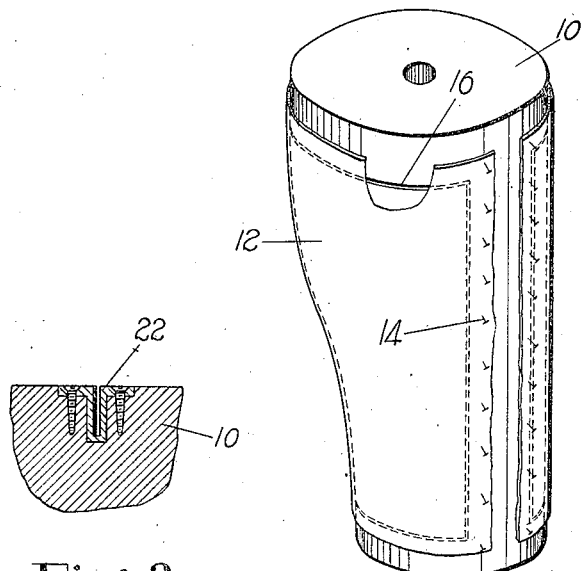
Figure 1 is a perspective view of a puttee block with a lasted puttee thereon.
Fig. 3 is a detail.
Figure 2:
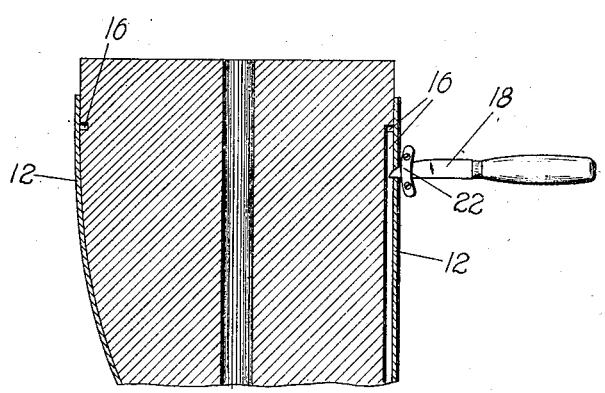
Fig. 2 is a section illustrating the trimming of the lasted puttee.

The puttee block 10 is shaped like the calf of a human leg, but is considerably larger in diameter. The puttee 12 is prepared for lasting in the ordinary manner, and is tightly stretched over and tacked to the block by the tacks 14. The block is so large that the edges of the puttee do not overlap. The block has a slot 16 which corresponds to the outline to which it is desired to trim the puttee when it has set in shape. The slot has two approximately straight and parallel portions corresponding to the overlapping edges of the puttee, and two nearly circular portions, connecting the upper and lower ends, respectively, of the straight portions and corresponding to the top and bottom of the puttee. This slot is preferably somewhat wider than the thickness of a knife blade, and deep enough to afford the requisite lateral support to the point of the blade. When the puttee has dried and set in place on the block, a knife blade 18 is forced through the leather into the slot 16, which will then guide the point of the knife in trimming around the puttee and reducing it to the shape desired.

The knife may have a guard flange 20 to prevent dragging the end of the blade on the bottom of the slot 16, and the slot may be lined with metal as at 22 to avoid wear of the block (which will preferably be of wood).

My invention thus insures accurate and rapid trimming of the lasted puttee without the necessity of handling it in an unwieldly condition, and without the necessity of additional apparatus.

Having thus described my invention, what I claim as new and desire to secure by Letters Patent of the United States is:—

1. A block for shaping an object of sheet material, said block having a pair of substantially parallel guides for a trimming tool and constructed to support fastenings for the edges of said sheet between said guides.

2. A block for shaping an object of sheet material, said block being formed of material capable of receiving tacks and having a pair of substantially parallel guides for a trimming tool, whereby the sheet may be first secured on the block with its edges approaching but not overlapping and may then be separated from the block by a trimming tool engaging said guides.

3. A shaping block of the character described, said block being substantially cylindrical in cross-section and having a pair of approximately straight and parallel guides for a trimming tool extending longitudinally thereof, said block being constructed to support fastenings for the edges of said sheet between said guides.

4. A shaping block of the character described, said block being substantially cylindrical in cross-section and having a pair of approximately straight and parallel guides for a trimming tool extending longitudinally thereof and also having tool guiding channels extending around it, said block being constructed to support fastenings for the edges of said sheet between said guides.

5. A block for shaping an object of sheet material, said block having a pair of substantially parallel guides for a trimming tool and constructed to support fastenings for the edges of said sheet between said guides, said guides being lined with metal.

In testimony whereof I have signed my name to this specification.

JOSEPH FAUSSE.